(12) United States Patent
Goma et al.

(10) Patent No.: US 7,605,950 B2
(45) Date of Patent: Oct. 20, 2009

(54) PRINTING APPARATUS

(75) Inventors: Tatsuji Goma, Wakayama (JP); Takeshi Nishihara, Wakayama (JP); Yoshiyuki Nakatani, Wakayama (JP)

(73) Assignee: Noritsu Koki Co. Ltd., Wakayama-ken (JP)

( * ) Notice: Subject to any disclaimer, the term of this patent is extended or adjusted under 35 U.S.C. 154(b) by 743 days.

(21) Appl. No.: 11/404,270

(22) Filed: Apr. 14, 2006

(65) Prior Publication Data

US 2006/0232832 A1 Oct. 19, 2006

(30) Foreign Application Priority Data

Apr. 15, 2005 (JP) ............................. 2005-118321

(51) Int. Cl.
*H04N 1/46* (2006.01)
(52) U.S. Cl. ..................... 358/3.26; 358/1.12; 358/518; 382/167
(58) Field of Classification Search ................ 358/1.12, 358/1.4, 3.1, 3.01, 3.06, 3.21, 3.24, 3.26, 358/504, 518; 382/167; *H04N 1/46*
See application file for complete search history.

(56) References Cited

U.S. PATENT DOCUMENTS

| 7,021,737 | B2* | 4/2006 | Yamada | 347/19 |
| 7,069,164 | B2* | 6/2006 | Viturro et al. | 702/85 |
| 2005/0052488 | A1* | 3/2005 | Inoue | 347/19 |

FOREIGN PATENT DOCUMENTS

| JP | 2001-142162 | 5/2001 |
| JP | 2005-101831 | 4/2005 |

* cited by examiner

*Primary Examiner*—James A Thompson
(74) *Attorney, Agent, or Firm*—Fulbright & Jaworski LLP (57) ABSTRACT

A printing apparatus for generating a test chart using a plurality of sheets of printing paper and correction data having high accuracy according to the test chart. Overlapping regions G are extracted from scanning data D1 and D2 of two test charts. Tendency in variation (inclination) of the density is obtained for one set of the scanning data in the overlapping regions G and such tendency in variation is reduced. The scanning data D1 and D2 are then combined together to eliminate the density difference, thereby obtaining a single set of combined scanning data D3. A correction data generation means updates a correction table based on density data of the scanning data D3.

5 Claims, 8 Drawing Sheets

PRINTING APPARATUS

FIELD OF THE INVENTION

The present invention relates to a printing apparatus, more specifically to a printing apparatus that sets the correction data for the print control sections based on the scanning data.

DESCRIPTION OF THE RELATED ART

As a printing apparatus configured as described above, there are printing apparatuses that create a test print sheet (a test chart of the present invention) from printing paper by carrying out exposure with a fluorescent print head (a print head of the present invention), then capture a line image of this test print sheet using a flatbed scanner, and set a correction table based on the density of exposure dot lines that have been captured. The correction table that has been obtained in this way is used as data for correcting unevenness in the luminance of light-emitting elements arranged on the exposure head. For example, see JP 2001-142162A (paragraph numbers [0011] to [0031], [0037], and FIGS. 1 to 15).

In the conventional technique described in that document, even numbers and odd numbers are given to fluorescent light-emitting elements corresponding to the three primary colors R (red), G (green), and B (blue) constituting the fluorescent print head and the test print sheet is created by carrying out exposure on the printing paper by controlling these fluorescent light-emitting elements. With this test print sheet, a plurality of test exposure dot lines are formed corresponding to fluorescent light-emitting elements that have been given even numbers or odd numbers, the densities of central positions in the main scanning direction (width direction of the exposure dot lines) of the exposure dot lines that have been obtained by the flatbed scanner are obtained at a predetermined spacing in the sub scanning direction. Moreover, a mean value of the density data contained in check windows is set as a representative density and correction coefficients of the fluorescent light-emitting elements are created from the representative density and stored in the correction table.

Printing on a recording medium of a width exceeding (or a width equal to) the printing width of the print head in the main scanning direction is ideal for these test charts. However, when assuming a photo printing apparatus to be installed in a desktop publishing store as the photo printing apparatus of the present invention, there are not that many opportunities for printing large sizes in a desktop publishing store and it is common that wide width printing paper (photosensitive material) is not always readily available.

Under these circumstances it is conceivable to create a plurality of test charts using a plurality of sheets of printing paper of a width smaller than the printing width (exposure width) of the print head in the main scanning direction and to create a single test chart by connecting overlapping areas of the test charts using a software-based process, thereby generating correction data according to the test charts.

For this reason, when considering a process of combining two test charts for example and creating two test charts, test printing is carried out by displacing a leading printing paper to one side in the main scanning direction of the print head and displacing a trailing printing paper to the other side in the main scanning direction of the print head. Even when creating two test charts in this manner with conventional photo printing apparatuses, there are almost no occurrences of deviance in the densities of the respective test charts.

However, disparities in the scanning data may occur due to the scanner condition with respect to the scanner timing. According to tests by the applicants, many instances can be found of the influence of variation in the amount of light of the light source of the scanner and there was scope for improvement.

SUMMARY OF THE INVENTION

An object of the present invention is to reasonably configure a printing apparatus by which test charts of a plurality of printing materials are created and highly accurate correction data is created.

In accordance with an embodiment of the present invention, a printing apparatus comprises a print head, a scanner and a correction data generation means. A plurality of print control sections are arranged along a main scanning direction. The print head and a printing material is movable relative to each other in a sub scanning direction perpendicular to the main scanning direction. The print control sections is controllable during the relative movement of the print head and the printing material, based on the print data that has been set in the print control sections of the print head to generate a test chart. The scanner obtains scanning data by scanning the test chart and the correction data generation means sets correction data for the print control sections according to the scanning data. The test chart is generated by setting a plurality of printing materials, which have a dimension shorter than a printable region of the print head in the main scanning direction, in different positions in the main scanning direction of the print head.

The correction data generation means executes an overlapping region extracting process, a tendency correcting process, a combining process and a correction data generating process. The overlapping region extracting process extracts overlapping regions from the scanning data of the test chart set as a reference chart and the scanning data of the test chart set as a correction target chart from among a plurality of the test charts. The tendency correcting process obtains the tendency in variation in density in the main scanning direction of the correction target chart with respect to the reference chart in the overlapping regions extracted by the overlapping region extracting process and corrects a density of the tendency in variation. The combining process joins together the scanning data of the correction target chart corrected by the tendency correcting process and the scanning data of the reference chart to generate combined scanning data. The correction data generating process generates the correction data from the combined scanning data generated by the combining process.

With this configuration in accordance with an exemplary embodiment of the present invention, correction is carried out in which, after one of a plurality of test charts is set as the reference chart and the others are set as correction target charts. The tendency correcting obtains tendency in variation in density in the main scanning direction of the correction target charts in overlapping regions of the respective sets of scanning data. The setting is performed to eliminate tendency in variation in the scanning data of the correction target charts or to extremely reduce a value of tendency in variation. After this, the combining process generates combined scanning data by joining together scanning data of the reference chart and scanning data of the after-correction correction target charts. After generating this combined scanning data it becomes possible to generate correction data corresponding to the plurality of print control sections of the print head. As a result, a printing apparatus is configured reasonably in which, even without using large size printing materials, a test chart is created using a plurality of printing materials of a small size and highly accurate correction data is generated.

In accordance with an embodiment of the present invention, the correction data generation means comprises the density correcting process and the combining process. The density correcting process obtains and eliminates density difference of the overlapping regions between the scanning data of the correction target chart corrected by the tendency correcting process and the scanning data of the reference chart. The combining process joins together scanning data of the correction target chart, corrected by the tendency correcting process and the density correcting process, and scanning data of the reference chart to generate combined scanning data.

With this configuration, a density difference between the overlapping region of the scanning data of the reference chart and the overlapping regions of the scanning data of the after-correction correction target charts can be eliminated by the darkness correcting, and therefore combined scanning data can be generated in which density is even further made uniform.

In accordance with an embodiment of the present invention, the test chart can have a structure in which a plurality of pixel lines are formed corresponding to the plurality of print control sections. The tendency correcting process involves obtaining tendency in variation of the density by comparing, in a plurality of locations in the main scanning direction, the density of pixel lines formed by the same print control section in the overlapping regions between the scanning data of the reference chart and the scanning data of the correction target chart. The tendency correcting process then corrects the density of the pixel lines of the scanning data so as to remove tendency in variation in the density.

With this configuration, the tendency in variation in density with high accuracy can be obtained according to density of specified pixel lines formed on the printing materials by the print control sections during generation of the test charts. The influence of variation in the amount of light of the light source of the scanner can be eliminated by correcting the density of the pixel lines according to the obtained tendency in variation in the density.

In accordance with an embodiment of the present invention, the density correcting process comprises comparing in a plurality of locations in the main scanning direction the density of pixel lines formed by the same print control section in overlapping regions between the scanning data of the reference chart and the scanning data of the correction target chart corrected by the tendency correcting process. The density correction process then carries out another process in which density data of all pixel lines of the scanning data of the correction target chart is shifted to obtain the density agreement or to reduce the density difference to a minimum.

With this configuration, the density of all the pixel line data of the scanning data of the correction target charts can be made to agree with the pixel lines of the reference chart or the density difference can be reduced such that the density of the specified pixel lines formed on the printing materials can be made to agree or the density difference can be reduced to a minimum, and therefore combined scanning data is generated having almost no density difference.

In accordance with an embodiment of the present invention, a flatbed-type scanner can be used as the scanner. When a plurality of the test charts are set in the scanner at a same time to obtain scanning data, the number of scanning operations that a scanner control means performs equals the number of test charts. The scanner control means obtains scanning data of a different test chart in each scanning operation.

With this configuration, in accordance with an exemplary embodiment of the present invention, when two test charts have been generated and are set on the flatbed scanner, the scanner control means carries out two scanning operations so that the scanning data of different test charts can be obtained during the respective scanning operations. That is, with devices in which two test charts are scanned on a flatbed scanner at the same time to obtain one set of data, a process is necessary in which scanning data corresponding to the two test charts is extracted. The present invention simplifies this process.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENT

Hereinafter, embodiments of the present invention will be described with reference to the accompanying drawings.

Figure 1:
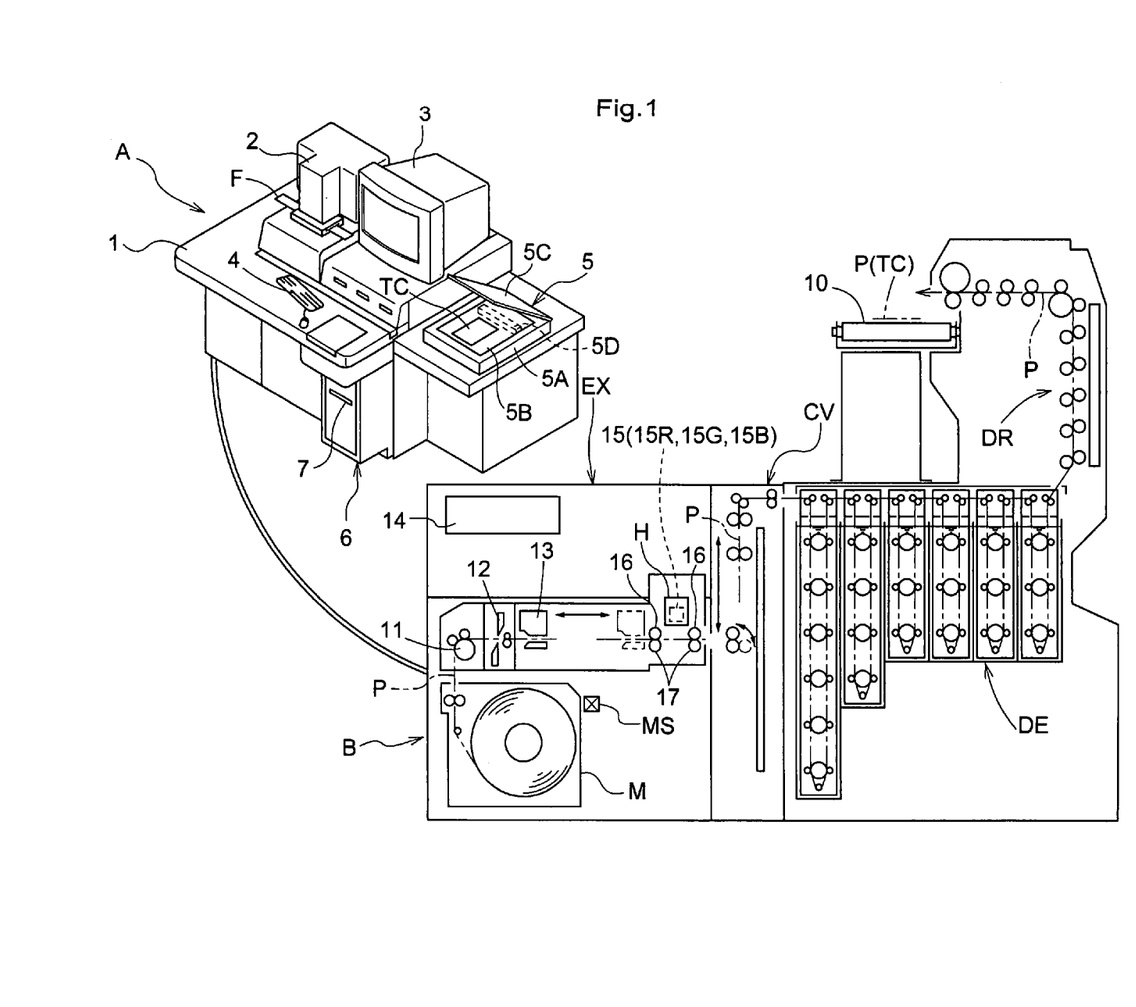
FIG. 1 schematically illustrates a configuration of a photo printing apparatus.

As shown in FIG. 1, a photo printing apparatus is configured comprising an operation section A and a print processing section B. The operation section A is provided with, on an upper surface of a table 1, a film scanner 2 that digitalizes and captures image information of a photo film F, a display 3 that displays process information, and a keyboard 4, and a flatbed scanner 5 is arranged at a side section. A processing device 6 constituted by a general purpose computer is provided under the table 1. Furthermore, in the processing device 6, a media drive 7 is provided that obtains image data recorded on a CD-R or a DVD-R or the like, and image data recorded on semiconductor media.

The flatbed scanner 5 has a scanning table 5B that is constituted by a transparent glass panel or resin panel, formed on a main unit 5A, and is provided with an operable platen cover 5C that covers the scanning table 5B, and a scanner section 5D that is capable of parallel movement inside in the main unit 5A.

The scanner section 5D is provided with a light source and a photoelectric transducer such as a CCD that extend in the main scanning direction, and an image of a scanning subject that is set on the scanning table 5B is obtained by the photoelectric transducer by causing the section to move in a sub scanning direction perpendicular to the main scanning direction while the light source of the scanner section SD is caused to emit light. Furthermore, the flatbed scanner S divides pixel lines Q (see FIG. 6) that are formed by light emitted by the light-emitting elements 18 in a line form in the sub scanning direction on the printing paper P into five or more regions in the main scanning direction and has a resolution capable of obtaining the densities of these respective regions.

The print processing section B is configured such that exposure of image data is carried out in an exposure section EX after the printing paper P as a printing material is cut to a print size, and after the exposure, the printing paper P is carried upward with its front and back reversed in a vertical carrying device CV and fed into a development section DE, then after the printing paper P that has undergone development in the development section DE has been dried in a drying section DR, it is sent in a lateral direction along a carrying belt 10 then sent from the carrying belt 10 into a sorter (not shown in drawings).

The exposure section EX feeds the printing paper P (an example of a printing material) from a printing paper magazine M using a pressure-contact feed roller 11, the paper is cut to a print size by a cutter 12, sent in a horizontal direction by a chuck 13, then fed into an exposure position from the chuck 13, and exposure of the image data is carried out by light rays from an exposure head H (an example of a print head) while the printing paper P is carried in a horizontal sub scanning direction in the exposure position. Furthermore, a control unit 14 is provided inside the exposure section EX.

The exposure head H is provided with a fluorescent light-emitting tube 15 (a general term for three types of fluorescent light-emitting tubes 15R, 15G, and 15B corresponding to the three primary colors) that downwardly emits light rays of the three primary colors R (red), G (green), and B (blue), and is also provided with a pair of exposure carrying rollers 16 on an upper carry side and a lower carry side of the printing paper P than the exposure position, and driven rollers 17 corresponding to the exposure carrying rollers 16.

Figure 2:
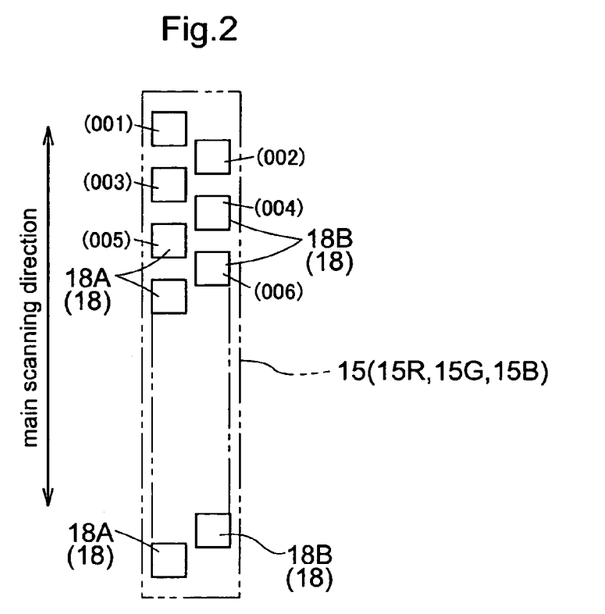
FIG. 2 schematically illustrates an arrangement of light-emitting elements.

The exposure head H is provided with three types of fluorescent light-emitting tubes 15R, 15G and 15B corresponding to the three primary colors R (red), G (green), and B (blue), the same as described in Patent Document 1. Each of the fluorescent light-emitting tubes 15R, 15G, and 15B has a structure in which a plurality of light-emitting elements 18 (an example of a print control section) are arranged in the main scanning direction in a linear array as shown in FIG. 2 inside a vacuum-state case formed of a component that permits the transmission of light rays, for example, a transparent glass (not shown in the drawing).

Incidentally, the three types of fluorescent light-emitting tubes 15R, 15G, and 15B obtain light rays of the three primary colors by causing light rays from the light-emitting elements 18 to pass through filters (not shown in drawings) corresponding to R (red), G (green), and B (blue), and in these light-emitting elements 18, the luminance of the light-emitting elements 18 can be controlled by regulating the voltage applied to electrodes corresponding to the respective light-emitting elements 18.

Figure 3:
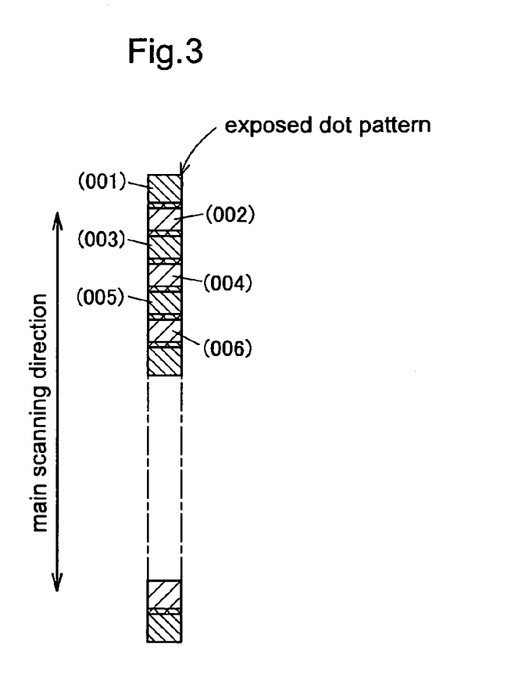
FIG. 3 illustrates an exposure dot pattern.

The plurality of light-emitting elements 18 are arranged in rows having a parallel positional relationship with light-emitting elements 18A given odd numbers and light-emitting elements 18B given even numbers as element numbers. Furthermore, when carrying out linear exposure in the main scanning direction on the printing paper P by controlling the timing of light emission of the light-emitting elements 18A, which have been given odd numbers as element numbers, and the light-emitting elements 18B, which have been given even numbers as element numbers, exposure dots (exposure regions (pixels) whose number in parentheses is an odd number) formed by light emitted from the light-emitting elements 18A, which have been given odd numbers, and exposure dots (exposure regions (pixels) whose number in parentheses is an even number) formed by light emitted from the light-emitting elements 18B, which have been given even numbers, slightly overlap in the main scanning direction as shown in FIG. 3.

In accordance with an embodiment of the present invention, the exposure system can be configured that same as described in Japanese Patent Publication No. 2001-142162, which is incorporated by reference in its entirety, in which light rays from the three types of fluorescent light-emitting tubes 15R, 15G and 15B of R (red), G (green), and B (blue) are irradiated onto positions that are different in the sub scanning direction (the same image data is exposed by shifting the timing), and may irradiate the light rays from the three types of fluorescent light-emitting tubes 15R, 15G, and 15B of R (red), G (green), and B (blue) simultaneously onto the same positions by using an optical system such as mirrors.

In accordance with an exemplary embodiment of the present invention, particular, in the exposure head H, only the red color elements are replaced with light-emitting diodes for example, or all the elements with light-emitting diodes (an example of a print control section). Further still, in accordance with an exemplary embodiment of the present invention, shutters (an example of a print section) such as a system of a plurality of liquid crystals can be provided along the main scanning direction in the path in which the light rays from the light source are guided to the printing paper P. The exposure head H can be configured so as to control the amount of light for each pixel using these shutters. A line type inkjet system and a sublimation type system are conceivable for use as the print head.

The vertical carrying device CV includes a carrying system, in which the printing paper P exposed by the exposure head H is taken in by pressure-contact rollers and fed into the development section DE by being moved upward in a reversed condition, and in the development section DE, the development processing is carried out by successively sending the printing paper P that has been fed into a plurality of development baths, using rollers including pressure-contact rollers. Furthermore, in the drying section DR, the printing paper P is dried by heat from an infrared heater and a drying airflow from a blower (not shown in drawings).

Figure 4:
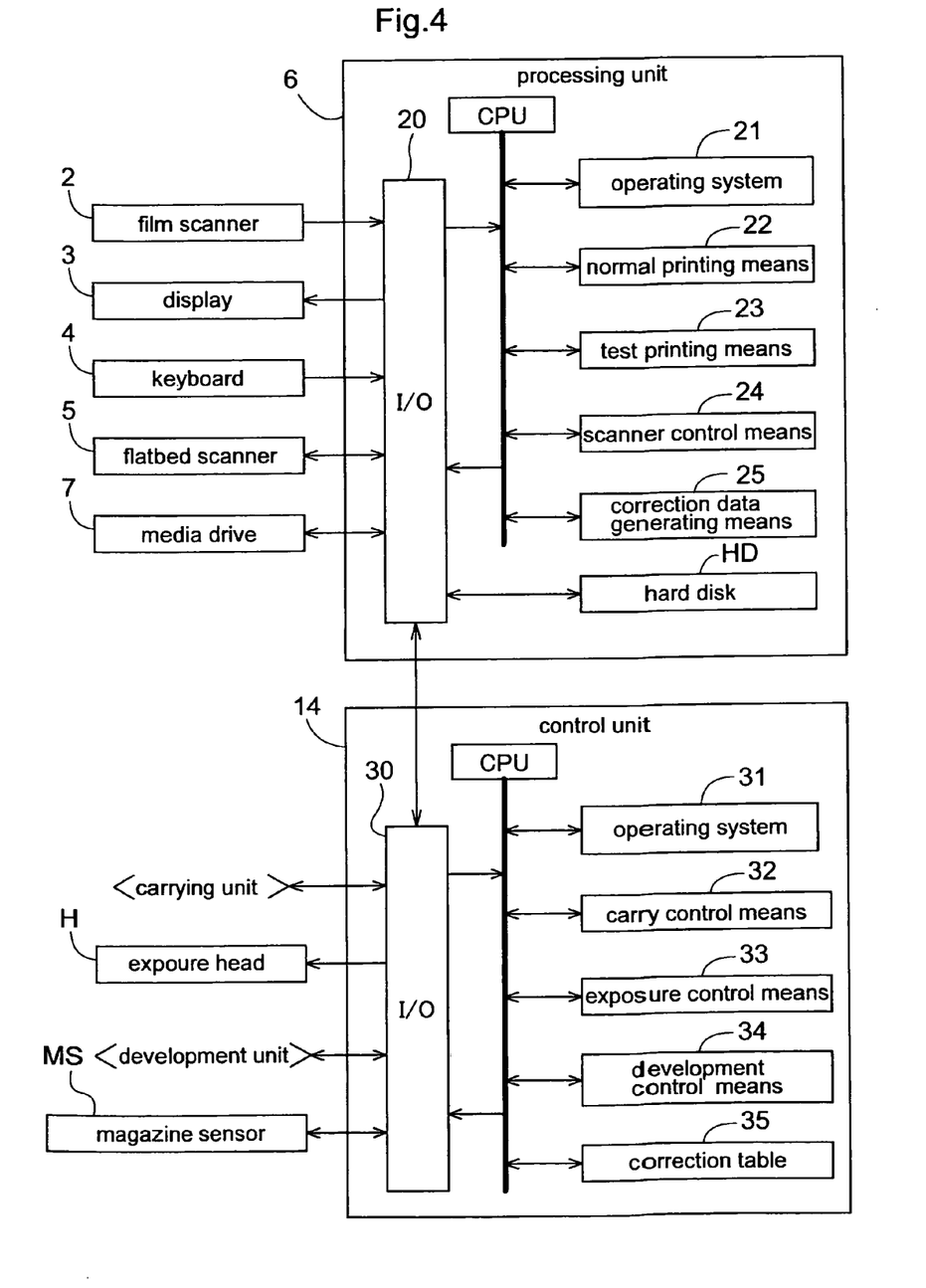
FIG. 4 is a block circuit diagram of a control system.

In accordance with an embodiment of the present invention, a control system of the photo printing apparatus can be illustrated as shown in FIG. 4. Namely, the processing device 6 is provided with a microprocessor (CPU) and an input-output interface 20 that carries out input and output of information with respect to the microprocessor (CPU). An input-output system is provided by which information is accessed between the input-output interface 20 and the film scanner 2, the display 3, the keyboard 4, the flatbed scanner 5, the media drive 7, and a hard disk HD respectively. Furthermore, an input-output system is formed by which information is accessed between the data bus of the microprocessor CPU and an operating system 21, a normal printing means 22, a test printing means 23, a scanner control means 24, and a correction data generation means 25 respectively.

The operating system 21 displays information necessary to the processing device 6 on the display 3, and functions as an interface that achieves a process in which when information is displayed on the display 3 for example when a normal printing process is to be carried out in accordance with order information, the image data as the print target and the order data are obtained and transferred to the normal printing means 22.

The normal printing means 22 achieves print processing by transferring image data obtained via the film scanner 2 or the media drive 7, and order information obtained via the keyboard 4 or the like to the print processing section B. Furthermore, the test printing means 23 prints a chart based on the exposure data on the printing paper P by transferring data from the magazine sensor MS shown in FIG. 1, exposure data (an example of print data) for chart generation, and control data to the print processing section B, thereby generating a test chart TC (a superordinate concept of TC1 and TC2 described later in FIG. 9) shown in FIG. 5.

By controlling the flatbed scanner 5, the scanner control means 24 achieves a process in which scanning data from a scanning subject (printing paper P or the like) that has been set is obtained and captured by the processing device 6. The correction data generation means 25 carries out a process in which correction data is generated from scanning data obtained by scanning the test chart TC using the flatbed scanner 5, this correction data is transmitted to the print processing section B, and a correction table 35 (see FIG. 4) is updated (set). Although not described in detail, the correction table 35 is set for each type of paper and a process is carried out in which the corresponding correction table 35 is updated according to the paper type determined according to a code section 40A (see FIG. 5) of the test chart TC.

The control unit 14 is provided with a microprocessor (CPU) and an input-output interface 30 that carries out input and output of information with respect to the microprocessor (CPU). An input-output system is provided for the input-output interface 30 for the carrying unit that carries the printing paper P in the sections of the print processing section B, the exposure head H, the development unit that carries out temperature control and liquid level control of the developing liquid in the plurality of development baths in the development section DE, and the magazine sensor MS that specifies the type of printing paper magazine M respectively. Furthermore, an input-output system is formed by which information is accessed between the data bus of the microprocessor CPU and an operating system 31, a carry control means 32, an exposure control means 33, a development control means 34, and a correction table 35 respectively.

The operating system 31 carries out basic process involved in obtaining signals from the sensor system (not shown in drawings) and outputting control signals to the various control systems, and also executes process for the carry control means 32, the exposure control means 33, and the development control means 34 respectively. The carry control means 32 controls the carrying unit to achieve carrying of the printing paper P. The exposure control means 33 controls the exposure head H to achieve exposure of the image data on the printing paper P. The development control means 34 achieves control of liquid temperature and liquid levels in the development section DE. The correction table 35 achieves a process in which the luminance of the light-emitting elements 18 of the respective fluorescent light-emitting tubes 15R, 15G and 15B in the exposure head H is set.

The operating system 21, the normal printing means 22, the test printing means 23, the scanner control means 24, and the correction data generation means 25 in the processing device 6, as well as the operating system 31, the carry control means 32, the exposure control means 33, and the development control means 34 in the control unit 14 are envisaged as software-based developments on semiconductor memories (not shown in drawings). It is appreciated that logic-based hardware configurations or configurations involving combinations with hardware can be also utilized. In addition to the data bus, for achieving control, the control system also requires such buses as a control bus and an address bus, but the control bus, the address bus, and types of interfaces are not shown in the drawings in order to avoid complexity.

The photo printing apparatus is operable to correct unevenness in the luminance of the light-emitting elements 18 of the fluorescent light-emitting tubes 15R, 15G and 15B of the exposure head H with a high degree of accuracy based on the correction data of the correction table 35. When carrying out luminance correction, a test chart TC as shown in FIG. 5 is created by a process in which preset exposure data is exposed on the printing paper P by the test printing means 23 and the correction data generation means 25 generates correction data by scanning the test chart TC with the flatbed scanner 5 and updates the correction data of the correction table 35.

Figure 5:
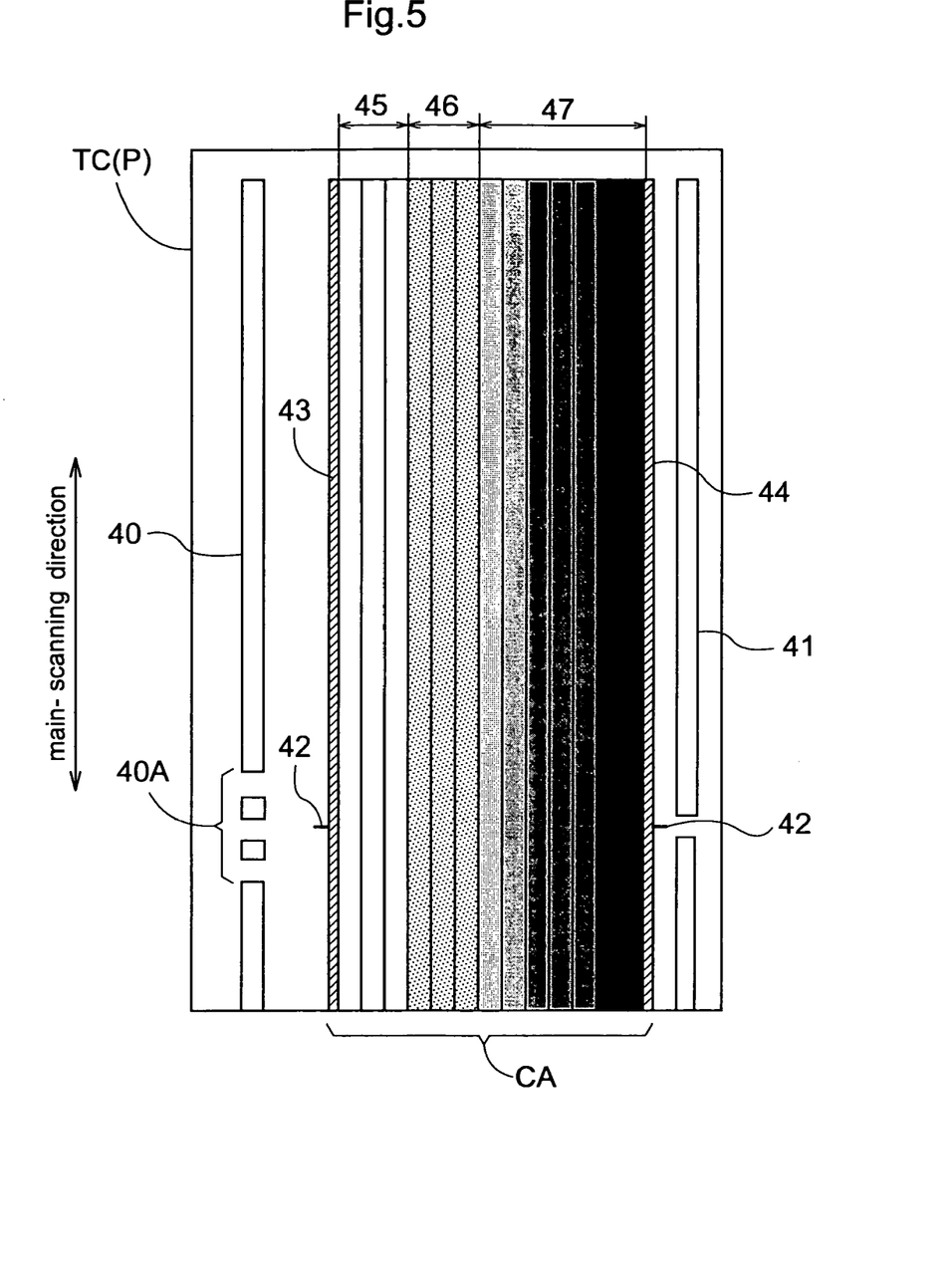
FIG. 5 illustrates a test chart.

It should be noted that, in generating the test chart TC, exposure is carried out in a form in which exposure data is transmitted to the exposure head H in a state converted by correction data by correction data of the correction table 35 that is already set being captured by the exposure control means 33, and after this exposure development is carried out by carrying the printing paper P to the development section DE, then drying the paper in the drying section DR, thereby generating the test chart TC shown in FIG. 5.

As shown in FIG. 5, the test chart TC is formed having the code section 40A indicating a paper type, and is configured by a chart region CA formed in a region sandwiched by a start bar 40, which functions as a reference indicating a front portion side of the chart, and an end bar 41 indicating an end portion side of the chart. Although the form of process is not described, with the code section 40A indicating the paper type in the start bar 40, data corresponding to the type of the printing paper P determined according to information from the magazine sensor MS is selected as image data. The test chart TC has a structure symmetrical in the main scanning direction centered on the code section 40A, but in FIG. 5 a test chart TC is shown that is formed by exposing only a portion of the data of the test chart on a small size printing paper P. It should be noted that a small size printing paper P refers to a printing paper P in which the size in the main scanning direction during scanning is shorter than that of a region exposable (printable) by the exposure head H in the main scanning direction.

A center indicator 42 is formed in a central position in the main scanning direction of the front portion side and rear portion side of the chart region CA, and a pixel line section 43 created by emitting light from only the light-emitting elements 18A, which are given odd numbers, and a pixel line section 44 created by emitting light from only the light-emitting elements 18B, which are given even numbers, are formed at the front portion side and the rear portion side of the chart region CA.

Figure 6:
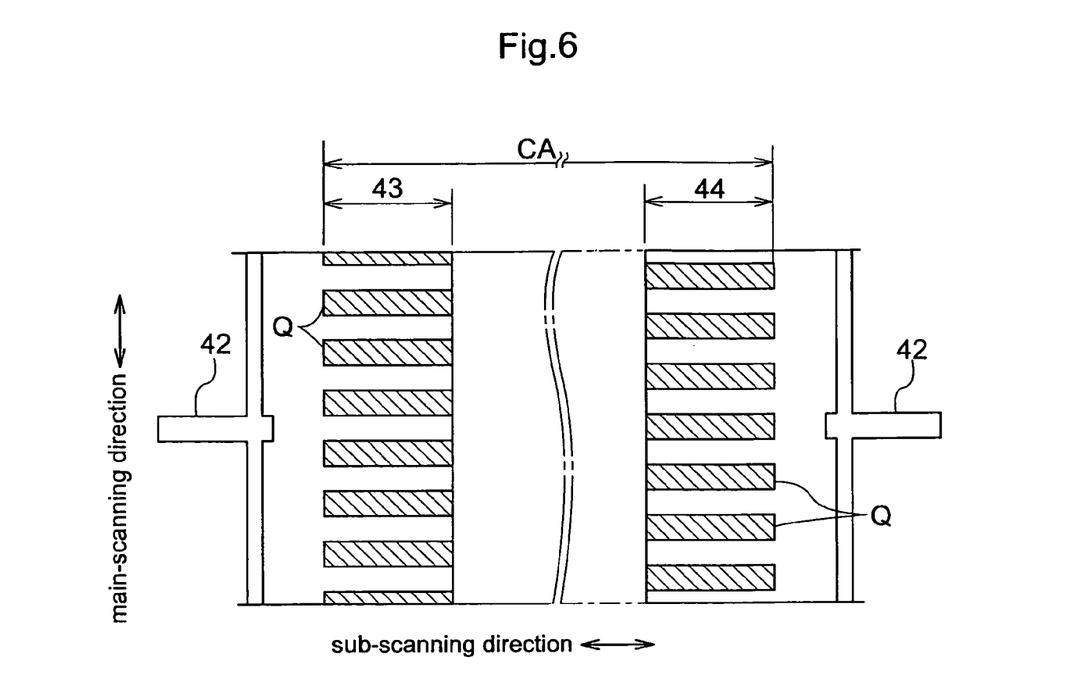
FIG. 6 is an enlarged view showing a structure of the test chart.

An enlargement of the pixel line sections 43 and 44 can be illustrated as shown in FIG. 6. As shown in FIG. 6, a plurality of pixel lines Q, which are formed by light emitted from the light-emitting elements 18A given odd numbers in the pixel line section 43, are formed in a parallel stance in a comb tooth shape, and a plurality of pixel lines Q, which are formed by light emitted from the light-emitting elements 18B given even numbers in the pixel line section 44, are formed in a parallel stance in a comb tooth shape in the pixel line sections 43 and 44. The width of the pixel lines Q in the main scanning direction is equivalent to a pixel width.

The chart region CA is constituted by three primary color regions 45, which are formed in hues of yellow (Y), magenta (M), and cyan (C) respectively by independently emitting light from the light-emitting elements 18 of the three types of fluorescent light-emitting tubes 15B, 15G, and 15R of blue (B), G (green), and R (red), irregular color development regions 46 for confirming color development of the printing paper P by carrying out light emission of specified colors when emitting light of the three primary color regions, and gray color development regions 47, which are developed in a plurality of gradations of gray by causing simultaneous light emission of a predetermined amount of light of the three types of fluorescent light-emitting tubes 15B, 15G, and 15R of B (blue), G (green), and R (red). Incidentally, the three primary color regions 45, the irregular color development regions 46, and the gray color development region 47 correspond to the entire pixel region.

However, the photo printing apparatus in accordance with the an embodiment of the present invention is configured such that, when there is no printing paper P of width exposable by light rays from all the exposable (printable) regions of the exposure head H in the main scanning direction, a process can be carried out by which the correction data is updated using two test charts TC1 and TC2 (three or more sheets are also possible) by exposing in a manner in which an image of the test chart TC is distributed onto two sheets of the printing paper P. Incidentally, when creating the two test charts TC1 and TC2, exposure is carried on the respective sheets of printing paper P in a state in which the leading printing paper P is set on one side in the main scanning direction of the exposure head H and the trailing printing paper P is set on the other side in the main scanning direction of the exposure head H. Furthermore, when creating and using three or more test charts, in addition to the center indicator 42, it is necessary to form indicators on the test chart that clarify the relative positions in order to make clear the relative positional relationships of the respective test charts.

Figure 9:
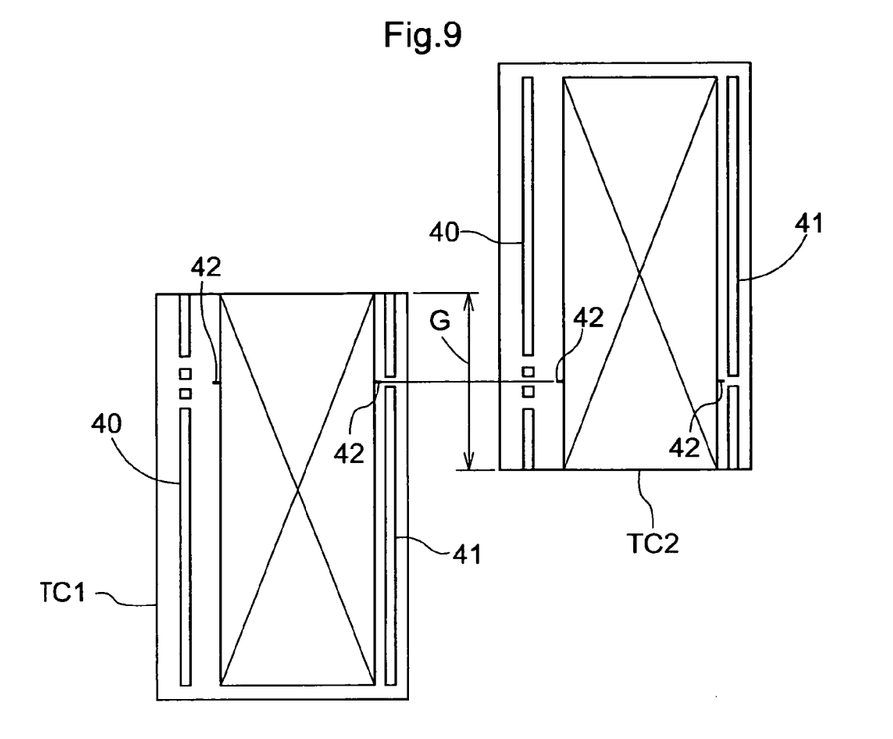
FIG. 9 illustrates a relationship between overlapping regions of two test charts.

Although a specific structure is not shown, the photo printing apparatus is provided with a mechanism capable of varying a relative positional relationship in the main scanning direction between the exposure head H and the printing paper P that is supplied to an exposure position of the exposure head H, and when generating a test charts TC (TC1 and TC2 shown in FIG. 9) using two sheets of printing paper P of a width shorter than a width of a region exposable by the exposure head H in the main scanning direction, the test charts TC1 and TC2 are created as shown in FIG. 9 by carrying out test prints in a manner in which a leading printing paper P is displaced to one side of the exposure head H in the main scanning direction and a trailing printing paper P is displaced to the other side of the exposure head H in the main scanning direction. Overlapping regions G having the same density data are formed in the test charts TC1 and TC2.

Figure 10:
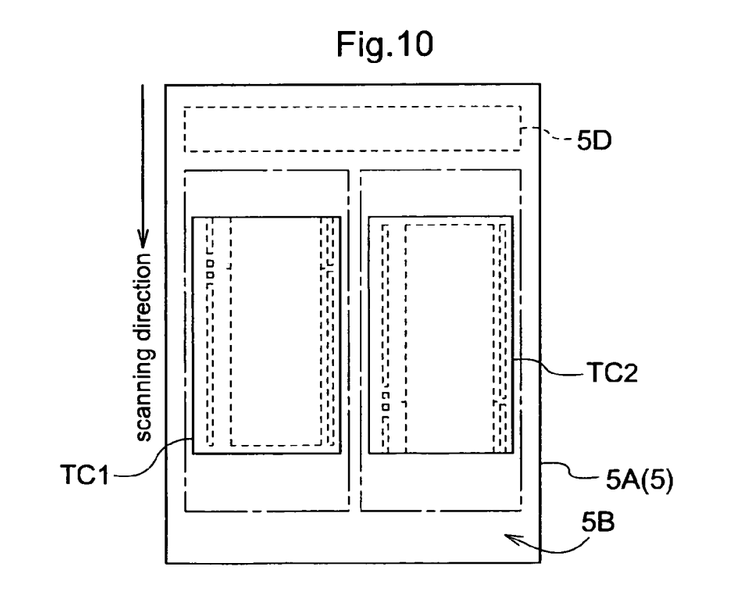
FIG. 10 illustrates placement of test charts on a flatbed scanner.

With this photo printing apparatus, a fundamental process is generating correction data according to fundamentally one test chart TC, but it also has a characteristic aspect in being able to conduct automatic process in which the correction data generation means 25 automatically generates correction data and appropriately updates (sets) the correction data of the correction table 35 by executing scanning by setting the two test charts TC1 and TC2 as described above side by side on the scanning table 5B of the flatbed scanner 5 as shown in FIG. 10.

When scanning a plurality of the test charts TC with the photo printing apparatus, it is not necessary to align the main scanning direction of the plurality of test charts TC in the same direction, and scanning can be carried out by freely setting the stance and arrangement of the test charts TC such as arranging the test charts TC in a positional relationship in which they stand in a row in the sub scanning direction on the scanning table 5B.

In particular, when carrying out scanning on the flatbed scanner 5, a manner of scanning can be set such that, after executing a prescan in which image data of the test charts TC set on the scanning table 5B is roughly obtained. High resolution scanning data is also obtained in a main scan. In this manner of setting scanning, by setting process in which the regions of the test charts TC are preset from data obtained in the prescan and scanning data is obtained from regions of the test charts TC that have been set in advance when the main scan is carried out. The problem of scanning unnecessary regions can be eliminated. This additionally achieves the main scan in an optimal manner by determining the stance of the test charts TC from the data obtained in the prescan.

It should be noted that scanning data D1 and D2 obtained when the test charts TC (TC1 and TC2) are set on the flatbed scanner 5 enable coordinate data of the positions of pixels in regard to the three primary colors of R (red), G (green), and B (blue) to be obtained. The scanning data D1 and D2 have a data structure comprising density data (8-bit data for example) corresponding to the coordinate data. A process described herein below is carried out similarly with regard to all three types of density data corresponding to the three primary colors of R (red), G (green), and B (blue).

Figure 8:
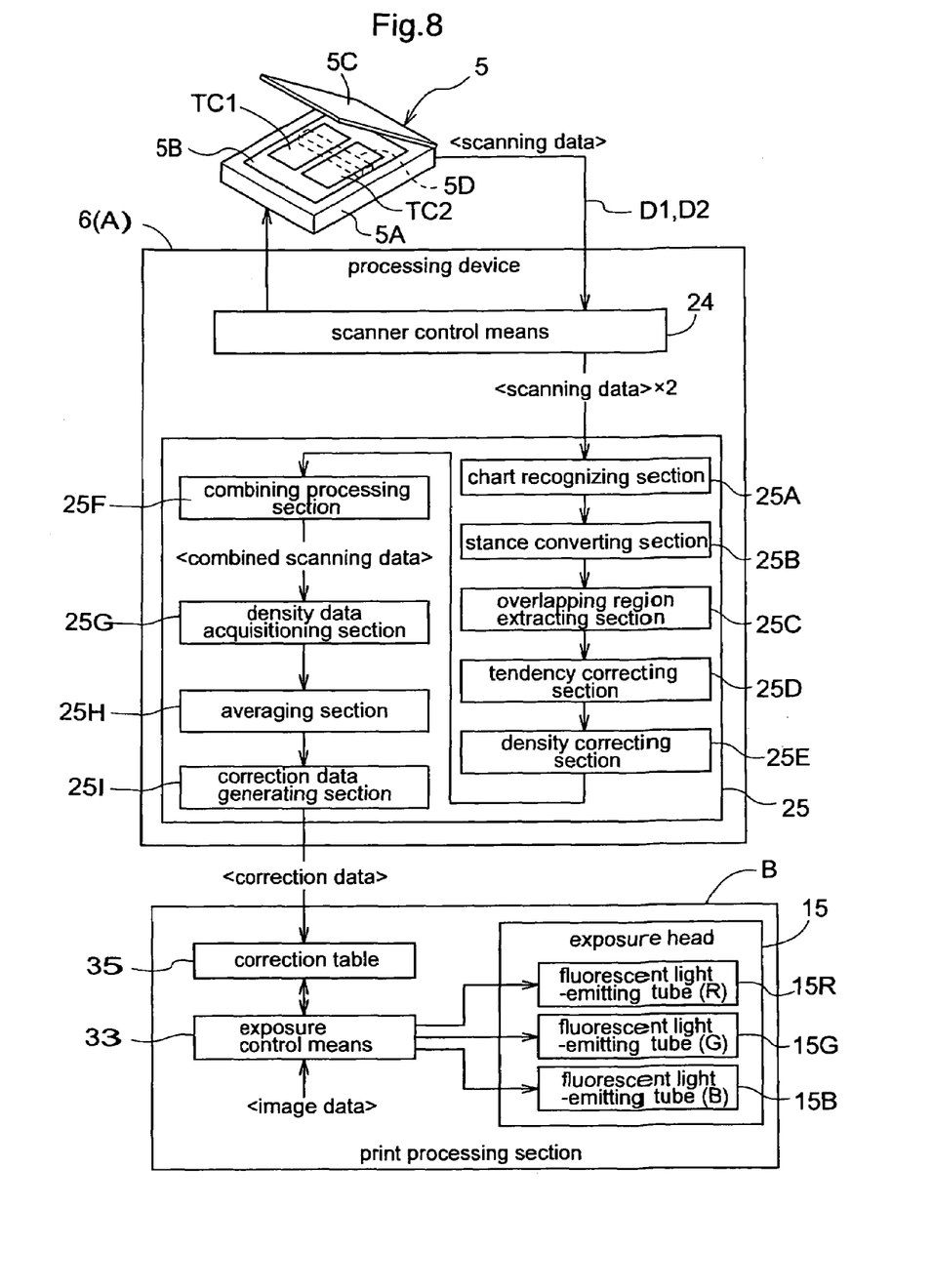
FIG. 8 shows an outline of a process flow.

As shown in FIG. 8, the correction data generation means 25 is provided with a chart recognizing section 25A, a stance converting section 25B, an overlapping region extracting section 25C, a tendency correcting section 25D, a density correcting section 25E, a combining processing section 25F, a density data acquisitioning section 25G an averaging section 25H, and a correction data generating section 25I that are software-based.

Of this plurality of processing sections, a process of the overlapping region extracting section 25C corresponds to overlapping region extracting, a process of the tendency correcting section 25D corresponds to tendency correcting, a process of the density correcting section 25E corresponds to density correcting, and a process of the combining processing section 25F corresponds to combining process.

An outline of a process of updating the correction table 35 is described with reference to FIG. 8. As described herein, the test charts TC1 and TC2 are generated by executing a process in which a mode for updating the correction data of the correction table 35 is selected in the processing device 6 and the test charts TC1 and TC2 are set in the flatbed scanner 5. The scanner control means 24 then operates the scanner section 5D of the flatbed scanner 5 twice such that scanning of the test chart TC1 is carried out first and after which scanning of the test chart TC2 is carried out. This enables the two types of scanning data D1 and D2 to be obtained corresponding to the test charts TC1 and TC2 which are transferred to the correction data generation means 25.

The scanner control means 24 carries out control in which the light source of the scanner section 5D lights up during scanning and continues to supply power continuously to the light source of the scanner section 5D in a period after the first scanning under the commencement of the next scanning. The amount of light from the light source in subsequent scanning can be kept stable.

In the correction data generation means 25, the chart recognizing section 25A extracts density data of the scanning data D1 and D2 and the stance converting section 25B determines the stance of the scanning data D1 and D2 so that a conversion process can be carried out to normalize the stance thereof.

To describe this specifically, the start bar 40 and the end bar 41 are formed in a stance along the main scanning direction of the exposure head H, and therefore the pixel lines Q are in a stance extending in a direction parallel to the sub scanning direction. For this reason, the stance converting section 25B determines the stance (inclination angle) taken by at least one of the start bar 40 and the end bar 41, and the main scanning direction (the sub scanning direction may also be used) of the scanning data D1 and D2, and coordinate conversion is carried out in which the scanning data D1 and D2 are rotated to make the start bar 40 agree with the sub scanning direction of the flatbed scanner 5 for example.

In regard to the process by the stance converting section 25B, it is not necessary for the main scanning direction of the test charts TC1 and TC2 and the main scanning direction or the sub scanning direction of the scanning data D1 and D2 to be in agreement, and is therefore omitted. Furthermore, a form of process of the stance converting section 25B can be set to a form of process to generate scanning coordinate system, as described herein for specifying scanning regions (in which a vertical direction and a horizontal direction of the coordinate system in an initial state agree with the main scanning direction and the sub scanning direction of the exposure head H). The before-rotation and after-rotation coordinate conversion parameters are set by rotating the stance of the scanning coordinate system by an angle corresponding to the stance (inclination angle) without rotating the scanning data D1 and D2. By using these conversion parameters, scanning data D1 and D2 of an appropriate stance can be created by simulation.

Next, the overlapping region extracting section 25C extracts the overlapping regions G (see FIG. 9) of the scanning data D1 and D2 of the test charts TC1 and TC2 respectively. The tendency correcting section 25D corrects tendency in the density data of the scanning data D1 according to the tendency of the density data in the overlapping regions G. The density correcting section 25E corrects the density data of the scanning data D1 so that the density data in the overlapping regions G becomes in agreement or the density difference is reduced to a minimum. The combining processing section 25F carries out a combining process of a form in which the scanning data D1 and D2 are connected together.

To describe this specifically, the overlapping region extracting section 25C extracts pixel lines Q in the scanning data D1 and D2 respectively. The overlapping region extracting section 25C obtains element numbers corresponding to the pixel lines Q of the pixel line sections 43 and 44 respectively using the center indicator 42 as a reference. The overlapping region extracting section 25C extracts regions having common element numbers in the scanning data D1 and D2 as the overlapping regions G When specifying the pixel lines Q, as shown in FIGS. 6 and 7 for example, the density data in an area intersecting a sampling line SL among the plurality of pixel lines Q is sampled and regions having high density are specified as positions of the pixel lines Q.

Figure 7:
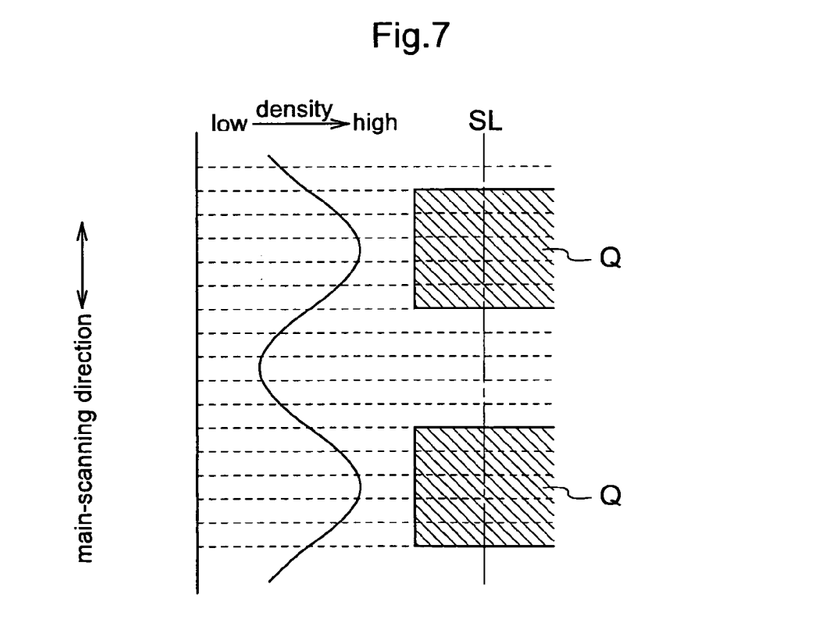
FIG. 7 shows a relationship between a pixel line and measured density.

As shown in FIGS. 6 and 7, the density data in areas intersecting the sampling line SL among the plurality of pixel lines Q has the highest density in a central position in the main scanning direction of the pixel lines Q. In regions where the pixel lines Q are not present, the density is lowest in a central position in the main scanning direction of those regions. Therefore, the pixel lines Q can be set relatively easily. Furthermore, since the density data varies in a set cycle, when a region that does not vary cyclically is distinguished, it is likely that dust has adhered to the test charts TC1 and TC2 or that a miss-detection has occurred. Therefore, the form of process proceeds by judging that the pixel lines Q must be present in regions where high density data should be measured according to the cycle rule.

Furthermore, one of the three primary color regions 45 (C (cyan) for example) clearly corresponding to the fluorescent light-emitting tubes 15R, 15G and 15B can be used as a sampling target for density data of the pixel lines Q. But the irregular color development regions 46 and the gray color development regions 47 also can be used. Then, the element numbers of the overlapping regions G extracted in this process are set corresponding to the three types of scanning data corresponding to the three primary colors of R (red), G (green), and B (blue).

A sequence is set such that the scanning data D1 of the test chart TC1 is obtained first by the flatbed scanner 5, then the scanning data D2 of the test chart TC2 is obtained. Therefore the test chart TC2 is set as a reference chart and the test chart TC1 is set as a correction target chart.

Figure 11:
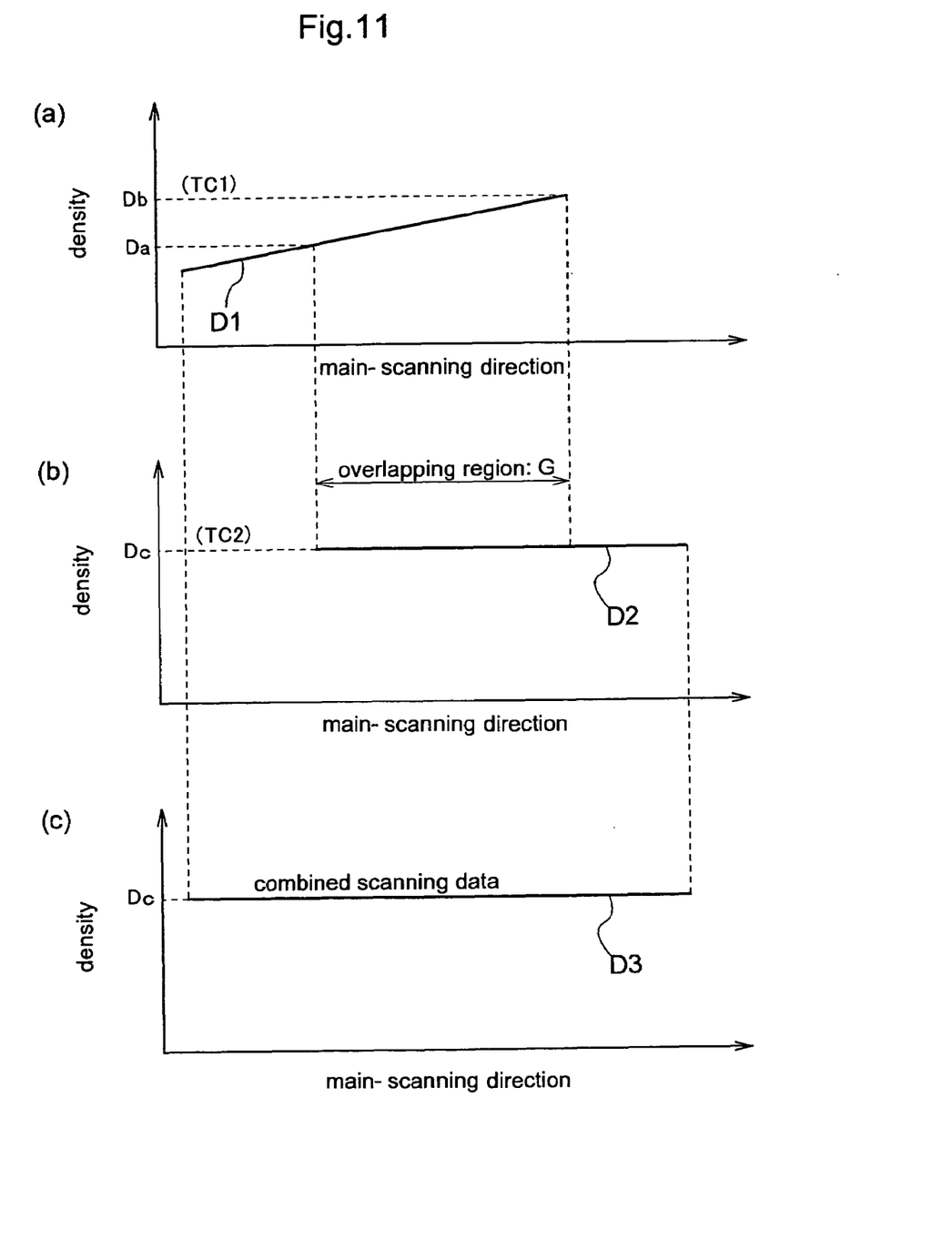
FIG. 11 shows graphs of the densities of the two sets of scanning data and the density of the combined scanning data.

Furthermore, as shown in FIG. 11, in the tendency correcting section 25D, tendency in variation in the density data of the overlapping region G of the scanning data D1 of the correction target chart (the test chart TC1) is obtained using as a reference the data of the overlapping region G of the scanning data D2 of the reference chart (the test chart TC2). One of the three primary color regions 45 (C (cyan) for example) clearly corresponding to the fluorescent light-emitting tubes 15R, 15G, and 15B can be used as a region (a region along the main scanning direction) in which this density data is obtained, but all the three primary color regions 45, or one or a plurality of the irregular color development regions 46 and the gray color development regions 47 can be also used.

That is, as illustrated in FIG. 11(a), the scanning data D1 of the correction target chart (test chart TC1) has a tendency in which the density data of the pixel line Q varies (inclines) linearly in a manner of a linear equation given a coefficient. Accordingly, with the tendency correcting section 25D, density data is obtained of a plurality of the pixel lines Q arranged at preset intervals in the main scanning direction of the overlapping region G of the scanning data D2 obtained from the test chart TC2 as the reference chart shown in FIG. 11(b).

Next, by obtaining from the scanning data D1 density data of the pixel lines Q having the same element numbers as the pixel lines of the scanning data D2, by which density data was obtained, tendency in variation (inclination) of the overlapping region G in the scanning data D1 is obtained and a coefficient is obtained that offsets the tendency in variation.

Then, by multiplying the density data of all the pixel lines Q of the scanning data D1 by this coefficient, tendency in variation in the density data is made parallel to the main scanning direction shown in FIG. 11. It should be noted that in obtaining tendency in variation, a form of process can be set such that all the density data in the main scanning direction of the overlapping region G in the scanning data D1 is obtained. A form of process can also be set such that sampling is performed at a plurality of varieties of pitch set in the main scanning direction and values of the tendency in variation (a plurality of which are obtained) obtained from the density data at each pitch are averaged.

Furthermore, one of the three primary color regions 45 (C (cyan) for example) clearly corresponding to the fluorescent light-emitting tubes 15R, 15G and 15B can be used for the pixel lines Q for obtaining tendency in the density data in the tendency correcting section 25D, but the irregular color development regions 46 and the gray color development regions 47 can be also used. Also, the coefficient that offsets the tendency in variation is multiplied by all the density data of the three primary colors of R (red), G (green), and B (blue).

It should be noted that the scanning data D2 of the reference chart (test chart TC2) has a predisposition for its density data to be substantially uniform in the main scanning direction. Furthermore, by setting the density data on an upstream side of a scanning operation in the overlapping region G in the scanning data D1 as Da, the density data on a downstream side of the scanning operation in the overlapping region G as Db and the density data of the scanning data D2 as Dc, a relationship Da<Db<Dc is established.

Reasons for the creation of tendency in variation and a density difference in density data can be considered to originate in the amount of light of the light source of the scanner section 5D of the flatbed scanner 5 not being stable when scanning commences. The amount of light continuing to increase after the commencement of the scanning. When obtaining the scanning data D2, the amount of light of the light source of the scanner section 5D is stable, and thus the density data can be considered to be uniform.

The density correcting section 25E compares the density data of the plurality of pixel lines Q set as sampling targets of the overlapping region G of the scanning data D1 corrected by the tendency correcting section 25D. The density data of the pixel lines Q of the scanning data D2 of the reference chart (test chart TC2) corresponding to (having same element number as) the pixel lines Q. A shift amount is obtained to make the compared density data of the pixel lines Q agree or have the smallest difference. A process by which data corresponding to the obtained shift amount is added to the density data of all the pixel lines Q of the scanning data D2 is carried out (a process of multiplying by a coefficient is also possible).

One of the three primary color regions 45 (C (cyan) for example) clearly corresponding to the fluorescent light-emitting tubes 15R, 15G, and 15B can be used similar to previously for the pixel lines Q when carrying out a process in the density correcting section 25E of obtaining a shift amount to make the density data agree or have the smallest difference. The irregular color development regions 46 and the gray color development regions 47 can be also used. Also, a process in which the density data is shifted is carried out on all the density data of the three primary colors of R (red), G (green), and B (blue).

After this, the combining processing section 25F carries out combining process of a form in which regions where the overlapping region G of the scanning data D1 that has undergone correction process in the density correcting section 25E has been taken out are joined to the scanning data D2 of the reference chart (test chart TC2), thereby generating combined scanning data D3 as shown in FIG. 11(c). This process is carried out on all the density data of the three primary colors of R (red), G (green) and B (blue) and element numbers are appended to all the pixel lines Q in the generated combined scanning data.

Furthermore, the process of the combining processing section 25F can be a process in which the overlapping region G is taken out of the scanning data D2 of the reference chart (test chart TC2) and the scanning data D1 after correction process is joined. The process of the combining processing section 25F can be a process in which the scanning data D1 and D2 are joined together at an intermediate position of their overlapping regions G.

Next, a process is carried out in which the density data acquisitioning section 25G sets a plurality of scanning regions in the three primary color regions 45, the irregular color development regions 46, and the gray color development regions 47. The density data acquisitioning section 25G obtains density data in these scanning regions, after which this data is averaged for each of the pixel lines Q, element numbers are appended and the data is saved. It should be noted that by setting regions close to a center of the pixel lines in the main scanning direction as the scanning regions, the influence from neighboring pixel lines Q is eliminated. The accuracy of density data to be obtained can be increased by setting a comparatively large number of regions in the sub scanning direction.

Then, after the density data of the plurality of pixel lines Q to which element numbers are appended is saved. The correction data generating section 25I generates correction data (a correction coefficient for example) by which the luminance of the light-emitting elements 18 of the fluorescent light-emitting tubes 15 in the exposure head H is made uniform according to the density data of the plurality of the pixel lines Q and this correction data is saved by being overwritten in the correction table 35.

In this way, in accordance with an exemplary embodiment of the present invention, even when large size printing paper P is not available, the test charts TC can be generated using a plurality of sheets of the printing paper P. The correction table for the light-emitting elements 18 of the fluorescent light-emitting tubes 15 of the exposure head H can be updated appropriately by an automatic process based on the plurality of test charts TC. In particular, when the scanning data D1 and D2 are obtained by scanning the two test charts TC1 and TC2 using the flatbed scanner 5, even when the density of one of the scanning data D1 and D2 varies in the main scanning direction and the densities are not in agreement, a single set of the scanning data D3 can be combined and generated from the two sets of scanning data D1 and D2 such that the correction table 35 can be updated appropriately.

In addition to the aforementioned embodiment, the present invention can also be configured as follows.

(a) A structure in which the exposure head of the printing apparatus moves on a photosensitive surface side of a fixed photosensitive material (an example of a printing material) can be applied. A printing apparatus provided with this exposure head is provided with a print control section such as light-emitting diodes in the main scanning direction of the exposure head and an operation is carried out in which this exposure head is made to move in the sub scanning direction.

(b) A configuration can be used in which, as a scanner, a scanner section that obtains images is fixed and the printing paper P is fed into the scanning section.

(c) A form of process can be set in which three or more test charts are generated, then a single test chart is generated by combining these test charts, thereby updating the correction table. When carrying out this process, a form of process can be set such that only one of the plurality of test charts is set as the reference chart and the tendency in variation and densities of the other test charts are corrected based on this reference chart.

(d) In a printing apparatus in which exposure is carried out by moving the printing paper P in the sub scanning direction with respect to the exposure head, in order to create a plurality of test charts using small size printing paper, a configuration can be used in which the exposure head is able to undergo positional shifts in the main scanning direction. A configuration can be used in which the printing paper magazine is able to undergo positional shifts in the main scanning direction.

The present invention is also applicable to a printing apparatus provided with a special-purpose scanner for carrying out scanning of the test charts and a printing apparatus that develops a photosensitive material without using a developing liquid.

What is claimed is:

1. A printing apparatus comprising:

a print head comprising a plurality of print control sections arranged along a main scanning direction, wherein the print head and a printing material is movable relative to each other in a sub scanning direction perpendicular to the main scanning direction, and said print control sections being controllable during the relative movement of the print head and the printing material, based on print data that has been set in the print control sections of the print head to create a test chart;

a scanner for obtaining scanning data by scanning the test chart; and a correction data generation means for setting correction data for the print control sections according to the scanning data; and wherein the test chart is generated by setting a plurality of printing materials, which have a dimension shorter than a printable region of the print head in the main scanning direction, in different positions in the main scanning direction of the print head; and wherein the correction data generation means is operable to execute:

overlapping region extracting process for extracting overlapping regions from the scanning data of the test chart set as a reference chart and the scanning data of the test chart set as a correction target chart from among a plurality of the test charts;

tendency correcting process for obtaining tendency in variation in density in the main scanning direction of the correction target chart with respect to the reference chart in the overlapping regions extracted in the overlapping region extracting process and correcting a density of the tendency in variation;

combining process for joining scanning data of the correction target chart corrected by the tendency correcting process and scanning data of the reference chart together to generate combined scanning data; and correction data generating process for generating the correction data from the combined scanning data generated by the combining process.

2. The printing apparatus of claim 1, wherein the correction data generation means comprises a density correcting process for obtaining a density difference of the overlapping regions between the scanning data of the correction target chart corrected by the tendency correcting and the scanning data of the reference chart and eliminating the density difference; and wherein the combining process is set to a form of process for joining scanning data of the correction target chart corrected by the tendency correcting process and the density correcting process, and scanning data of the reference chart together to generate combined scanning data.

3. The printing apparatus of claim 1, wherein the test chart has a structure in which a plurality of pixel lines are formed corresponding to the plurality of print control sections; and wherein the tendency correcting process is operable to obtain tendency in variation of the density by comparing, in a plurality of locations in the main scanning direction, the density of pixel lines formed by the same print control section in the overlapping regions between the scanning data of the reference chart and the scanning data of the correction target chart, and to correct the density of the pixel lines of the scanning data so as to remove tendency in variation in the density.

4. The printing apparatus of claim 3, wherein the density correcting process is operable to compare in a plurality of locations in the main scanning direction the density of pixel lines formed by the same print control section in overlapping regions between the scanning data of the reference chart and the scanning data of the correction target chart corrected by the tendency correcting process, and to carry out another process in which density data of all pixel lines of the scanning data of the correction target chart is shifted to obtain the density agreement or to reduce the density difference to a minimum.

5. The printing apparatus of claim 1, wherein a flatbed-type scanner is used as the scanner and comprises a scanner control means for performing scanning operations when a plurality of the test charts are set in the scanner at a same time to obtain scanning data, the number of scanning operations being equal to the number of test charts, and obtaining scanning data of a different test chart in each scanning operation.

* * * * *

UNITED STATES PATENT AND TRADEMARK OFFICE
CERTIFICATE OF CORRECTION

PATENT NO. : 7,605,950 B2  Page 1 of 1
APPLICATION NO. : 11/404270
DATED : October 20, 2009
INVENTOR(S) : Goma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Fifth Day of October, 2010

David J. Kappos
*Director of the United States Patent and Trademark Office*